(12) United States Patent
Mathias et al.

(10) Patent No.: US 7,157,178 B2
(45) Date of Patent: Jan. 2, 2007

(54) PROTON EXCHANGE MEMBRANE FUEL CELL

(75) Inventors: Mark Mathias, Pittsford, NY (US); Robert Darling, South Windsor, CT (US); David L. Wood, III, Sante Fe, NM (US)

(73) Assignee: General Motors Corporation, Detroit, MI (US)

( * ) Notice: Subject to any disclaimer, the term of this patent is extended or adjusted under 35 U.S.C. 154(b) by 338 days.

(21) Appl. No.: 10/720,631

(22) Filed: Nov. 24, 2003

(65) Prior Publication Data

US 2005/0112449 A1    May 26, 2005

(51) Int. Cl.
*H01M 4/94* (2006.01)
*H01M 8/10* (2006.01)

(52) U.S. Cl. .......................... 429/44; 429/30
(58) Field of Classification Search ................. 429/30, 429/44
See application file for complete search history.

(56) References Cited

U.S. PATENT DOCUMENTS

| | | | |
|---|---|---|---|
| 4,248,941 A | 2/1981 | Louis et al. | |
| 4,551,220 A * | 11/1985 | Oda et al. | 429/42 X |
| 4,973,530 A | 11/1990 | Vanderborgh | |
| 5,242,764 A | 9/1993 | Dhar | |
| 5,272,017 A | 12/1993 | Swathirajan et al. | |
| 5,318,863 A | 6/1994 | Dhar | |
| 6,074,692 A | 6/2000 | Hulett | |
| 6,077,612 A | 6/2000 | Hagedorn et al. | |
| 6,103,077 A | 8/2000 | DeMarinis et al. | |
| 6,194,094 B1 | 2/2001 | Sugawara et al. | |
| 6,261,711 B1 * | 7/2001 | Matlock et al. | 429/30 X |
| 6,365,293 B1 * | 4/2002 | Isono et al. | 429/30 |
| 6,899,971 B1 * | 5/2005 | Hamada et al. | 429/42 X |
| 2003/0064279 A1 * | 4/2003 | Yoshida et al. | 429/44 |
| 2005/0173244 A1 * | 8/2005 | Hayashi et al. | 204/282 |

* cited by examiner

*Primary Examiner*—Stephen J. Kalafut
(74) *Attorney, Agent, or Firm*—Charles H. Ellerbrock

(57) ABSTRACT

A fuel cell system with a proton exchange membrane. There is a cathode catalyst layer overlying the first face of the proton exchange membrane, and a cathode diffusion layer overlying the cathode catalyst layer. There is an anode catalyst layer overlying the second face of the proton exchange membrane, and an anode diffusion layer overlying the anode catalyst layer. The cathode diffusion layer has a water vapor permeance of less than about $3 \times 10^{-4}$ g/(Pa s m$^2$) at 80° C. and 1 atmosphere. The invention also relates to cathode diffusion layers for fuel cell systems.

64 Claims, 5 Drawing Sheets

PROTON EXCHANGE MEMBRANE FUEL CELL

BACKGROUND OF THE INVENTION

This invention relates generally to fuels cells, and more particularly to proton exchange membrane fuel cells having improved gas diffusion layers.

Historically, most developments in fuel cell technology involved applications supported by the government, such as the United States National Aeronautics and Space Administration (NASA), or applications related to electrical utility plants. However, recent developments in materials of construction and processing techniques have brought fuel cell developments closer to significant commercial application.

An important advantage of fuels cells is their 60–70% efficiency in converting stored chemical energy to electricity, with even higher efficiencies being theoretically possible. In addition, fuel cells produce virtually no pollution. These advantages make fuel cells particularly suitable for vehicle propulsion applications and replacement of internal combustion engines, which operate at less than 30% efficiency and which can produce undesirable emissions.

Generally, fuel cells operate by oxidizing a compound or molecule (that is, chemically combining with oxygen) to release electricity and thermal energy. Currently, there are a variety of fuel cell operating designs that utilize many different fuel and oxidant combinations. The most common fuel/oxidant combination is hydrogen and oxygen. In a typical fuel cell, hydrogen is consumed by reacting the hydrogen with oxygen (usually from air) to produce water, electrical energy, and heat. This is accomplished by feeding the hydrogen over a first electrode (anode), and feeding the oxygen over a second electrode (cathode). The two electrodes are separated by an electrolyte, which is a material that allows charged molecules or "ions" to move through it. Several different types of electrolytes can be used, including acid-type, alkaline-type, molten-carbonate-type, and solid-oxide-type. Proton exchange membrane (PEM) electrolytes (also known as solid polymer electrolytes) are of the acid-type, and they potentially have high-power and high-voltage, making them desirable for fuel vehicle applications.

In order for fuel cells to operate efficiently, it is often important for the system to be hydrated. The water required to hydrate the system may be carried in the anode and/or the cathode gas streams. Water is often available from the electrochemical reaction occurring in the fuel cell, and may be collected to be used in external humidification systems (i.e., external to the fuel cell stack) to hydrate the anode and cathode streams. However, these external humidification systems are often complex and reduce overall system efficiency.

Therefore, there is a need for a less complex fuel cell system which prevents the proton exchange membrane from drying out during operation.

SUMMARY OF THE INVENTION

The present invention solves this need by providing a fuel cell system with an improved cathode diffusion layer. The fuel cell system includes a proton exchange membrane having a first face and a second face; a cathode catalyst layer overlying the first face of the proton exchange membrane; a cathode diffusion layer overlying the cathode catalyst layer; an anode catalyst layer overlying the second face of the proton exchange membrane; an anode diffusion layer overlying the anode catalyst layer; wherein the cathode diffusion layer has a water vapor permeance of less than about $3 \times 10^{-4}$ g/(Pa s m$^2$) at 80° C. and 1 atmosphere.

The thickness of the cathode diffusion layer is generally less than about 1000 microns, typically in a range of about 150 to about 600 microns.

The bulk density of the cathode diffusion layer is generally less than about 2.0 g/cc, typically in a range of about 0.4 to about 0.8 g/cc.

The porosity of the cathode diffusion layer is generally greater than about 25%, typically in a range of about 50% to about 80%.

The cathode diffusion layer may contain at least about 0.25 wt % polytetrafluorethylene, and typically between about 5 wt % to about 15 wt % polytetrafluoroethylene, if desired.

Another aspect of the invention involves a cathode diffusion layer for a fuel cell system comprising a cathode diffusion layer containing less than about 15 wt % polytetrafluoroethylene and having a water vapor permeance of less than about $3 \times 10^{-4}$ g/(Pa s m$^2$) at 80° C. and 1 atmosphere. It can have a thickness of less than about 1000 microns, if desired. The cathode diffusion layer may have a bulk density of less than about 2.0 g/cc, if desired. The cathode diffusion layer can have a porosity greater than about 25%, if desired. The cathode diffusion layer can incorporate more than one of these limitations, if desired.

Another aspect of the invention involves a cathode diffusion layer for a fuel cell system comprising a cathode diffusion layer having a water vapor permeance of less than about $3 \times 10^{-4}$ g/(Pa S m$^2$) at 80° C. and 1 atmosphere, and wherein the cathode diffusion layer is less than about 1000 microns thick, and wherein a bulk density of the cathode diffusion layer is less than about 2.0 g/cc, and wherein the cathode diffusion layer has a porosity greater than about 25%.

As used herein, the properties of the diffusion layer refer to the properties of the uncompressed diffusion layer, i.e., of the diffusion layer itself, not that in an assembled fuel cell stack. As is well known, diffusion media will typically compress by anywhere from about 5% to about 50% when placed in a fuel cell stack, under compression pressures in the range of about 50 to about 500 psig. Thus, the water vapor permeance, thickness, bulk density, and porosity refer to the properties of the uncompressed diffusion layer, either cathode or anode (% polytetrafluoroethylene would not change for compressed v. uncompressed diffusion layers).

DESCRIPTION OF THE PREFERRED EMBODIMENT

Figure 1:
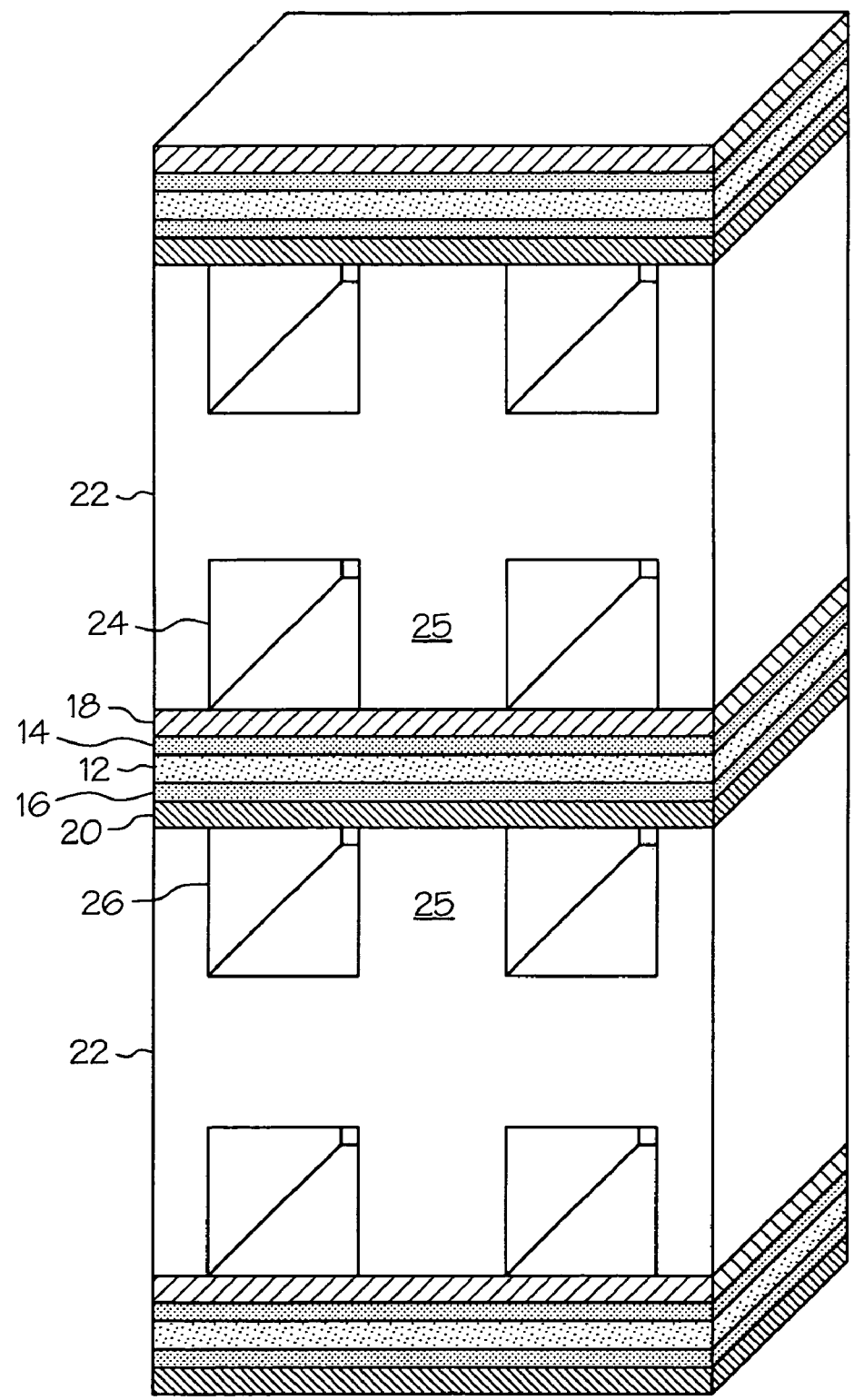
FIG. 1 is a partial, perspective view of a fuel cell stack according to the present invention.

FIG. 1 is a partial, sectional view of a fuel cell stack according to the present invention. The fuel cell stack includes a proton exchange membrane 12. Typically, the proton exchange membrane 12 is substantially flat. An anode catalyst layer 14 overlies one face of the proton exchange membrane 12, and a cathode catalyst layer 16 overlies the other face. The proton exchange membrane 12 and the catalyst layers 14 and 16 may be referred to as the membrane electrode assembly (MEA). An anode diffusion layer 18 overlies the anode catalyst layer 14, and a cathode diffusion layer 20 overlies the cathode catalyst layer 16. Bipolar plates 22 are provided, with one plate engaging the anode diffusion layer 18 and a second plate engaging the cathode diffusion layer 20. A first set of reactant gas flow channels 24 are provided in the bipolar plate 22 along a face engaging the anode diffusion layer 18. A second set of reactant gas flow channels 26 are provided in the bipolar plate 22 along a face engaging the cathode diffusion layer 20. Hydrogen gas is delivered to the anode side of the MEA through the first set of reactant gas flow channels 24, and oxygen (generally in the form of air) is delivered to the second set of reactant gas flow channels 26 to the cathode side of the MEA. The hydrogen and oxygen may be provided in a variety of forms, such as are well-known in the art. On each bipolar plate 22, lands 25 separate adjacent sections of the reactant gas flow channels 24 or 26. The lands 25 on each side of the bipolar plate 22 make direct contact with the respective diffusion layer 18 or 20 for that side of the bipolar plate 22.

The anode catalyst layer 14 and the cathode catalyst layer 16 may be provided in the membrane electrode assembly by any manner known to those skilled in the art. These electrodes 14 and 16 may be separate distinct layers, or each may be embedded at least partially in diffusion layers 18 or 20 respectively, or embedded partially in opposite faces of the proton exchange membrane 12. A combination, unitary membrane and electrode assembly with a solid polymer electrolyte membrane, and first and second electrodes at least partially embedded in opposed surfaces of the membrane is taught in Swathirajan et al., U.S. Pat. No. 5,272,017, issued Dec. 21, 1993, the disclosure of which is hereby incorporated by reference. These structural combinations are intended to be referenced, described, and covered whenever the electrodes or catalyst layer 14 and 16 are described herein as overlying the proton exchange membrane.

The diffusion layers 18 and 20 serve several functions common to all diffusion layers including: 1) providing electrical contact (and path for electrical flow) between the electrode catalyst layers 14 or 16 respectively and the electrochemical current collector (bipolar plate 22); 2) distributing and transporting feed gases effectively across the entire surface of the catalyst electrodes 14 and 16 respectively and across the proton exchange membrane 12, including across the lands 25; and 3) providing a conduit for the rapid transportation of products generated or remaining at the catalyst layers 14 or 16. The diffusion layers of the present invention serve an additional function: creating a high concentration of water vapor in the cathode diffusion layer sufficient to hydrate the proton exchange membrane. In some cases, this may be done without the use of a hydration system which is external to the membrane-electrode-diffusion layer assembly.

For operation with dry fuel cell streams, a cathode diffusion layer that provides a water vapor transmission barrier (i.e., low permeance) to the water that is produced in the fuel cell is needed. The reason for this is that the majority of water transport under dry operating conditions occurs with water in the vapor phase. There is very little water present in the liquid phase.

Figure 6:
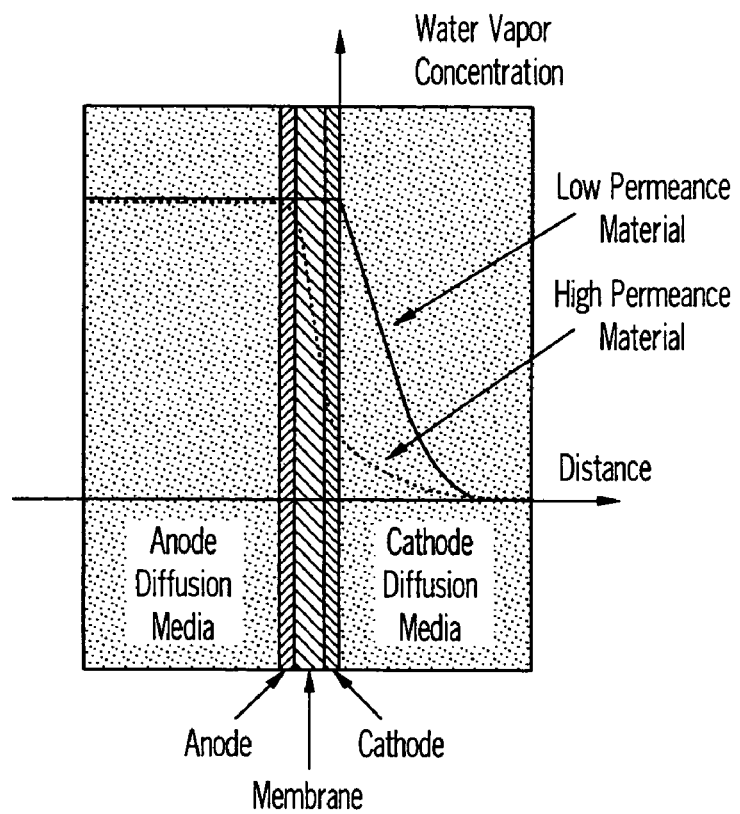
FIG. 6 shows the effect of the permeance of the cathode diffusion layer on water vapor concentration at the cathode catalyst layer/diffusion layer interface.

The effect of the cathode diffusion layer permeance is illustrated in FIG. 6 for the case where the majority of the water produced is exiting on the cathode side. This would be the case if the anode feed stream was saturated with water and the cathode feed stream was unhumidified. The flux of water leaving on the cathode side is determined approximately by the operating current density of the cell. FIG. 6 shows that a low permeance material for the cathode diffusion layer leads to a high water concentration at the catalyst layer. The water "piles up" at the interface of the cathode catalyst layer and the cathode diffusion layer in order to create enough of a water concentration driving force across the cathode diffusion layer in order to force the water out at the flux determined by the current density. Under dry operating conditions, this is a desirable scenario in that the ionomer in the catalyst layer and the membrane will stay wet and conducting. In the high permeance case, a smaller water vapor concentration gradient is established across the cathode diffusion layer. Thus, the ionomer is more likely to dry out, degrading fuel cell performance.

The low permeance material for the cathode diffusion layer should also be designed to allow liquid water to pass through readily if condensation occurs, such as during automotive start-ups from low (including subfreezing) temperatures as would be encountered in real-world usage or during generation of very high power densities (i.e., high water production rates). Otherwise, the liquid water will build up and block oxygen access to the cathode catalyst layer and degrade performance (i.e., flooding).

The cathode diffusion layer of the present invention is selected and constructed to have a water vapor permeance that is less than about $3 \times 10^{-4}$ g/(Pa s m$^2$) at 80° C. and 1 atmosphere, typically less than about $2 \times 10^{-4}$ g/(Pa s m$^2$), or less than about $1.5 \times 10^{-4}$ g/(Pa s m$^2$). The water vapor permeance can be determined using the test method described below.

When the water vapor permeance of the cathode diffusion layer is at this level, a water vapor concentration gradient is created during the operation of the fuel cell. The water vapor concentration is greatest at the face of the cathode diffusion layer closest to the proton exchange membrane, and the water vapor concentration is lowest at the face of the cathode diffusion layer closest to the bipolar plate. If the water vapor concentration at the face of the cathode diffusion layer closest to the proton exchange membrane is near saturation, the proton exchange membrane can be maintained in a fully hydrated state, improving the efficiency of the fuel cell stack.

In some situations, it may be desirable to select the properties of the anode diffusion layer so that they are different from the properties of the cathode diffusion layer, rather than using the same materials having the same properties for both layers. One way to achieve this difference is to use the same base material for both the cathode and anode diffusion layers, but to alter the properties of the base material. Also, the base material can be treated so that the cathode and anode diffusion layers have different properties. Alternatively, the cathode and anode diffusion layers can be made from different base materials so that the properties are different.

The water vapor permeance of the anode diffusion layer can be greater than about $3\times10^{-4}$ g/(Pa s m$^2$) at 80° C. and 1 atmosphere, and can be greater than about $4.5\times10^{-4}$ g/(Pa s m$^2$) at 80° C. and 1 atmosphere, if desired. The diffusion layers can be selected so that the water vapor permeance of the cathode diffusion layer is about 10 to about 50% of the water vapor permeance of the anode diffusion layer, if desired.

Providing a cathode diffusion layer having a water vapor permeance of less than about $3\times10^{-4}$ g/(Pa s m$^2$) at 80° C. and 1 atmosphere can be accomplished in a variety of ways, including, but not limited to, one or more of varying the thickness of the cathode diffusion layer, adjusting the bulk density of the cathode diffusion layer, adjusting the porosity of the cathode diffusion layer, including polytetrafluoroethylene in the cathode diffusion layer, adding a microporous layer to one or both surfaces of the diffusion layer, and/or filling the diffusion layer with carbon/graphite particles to densify the structure.

Figure 2:
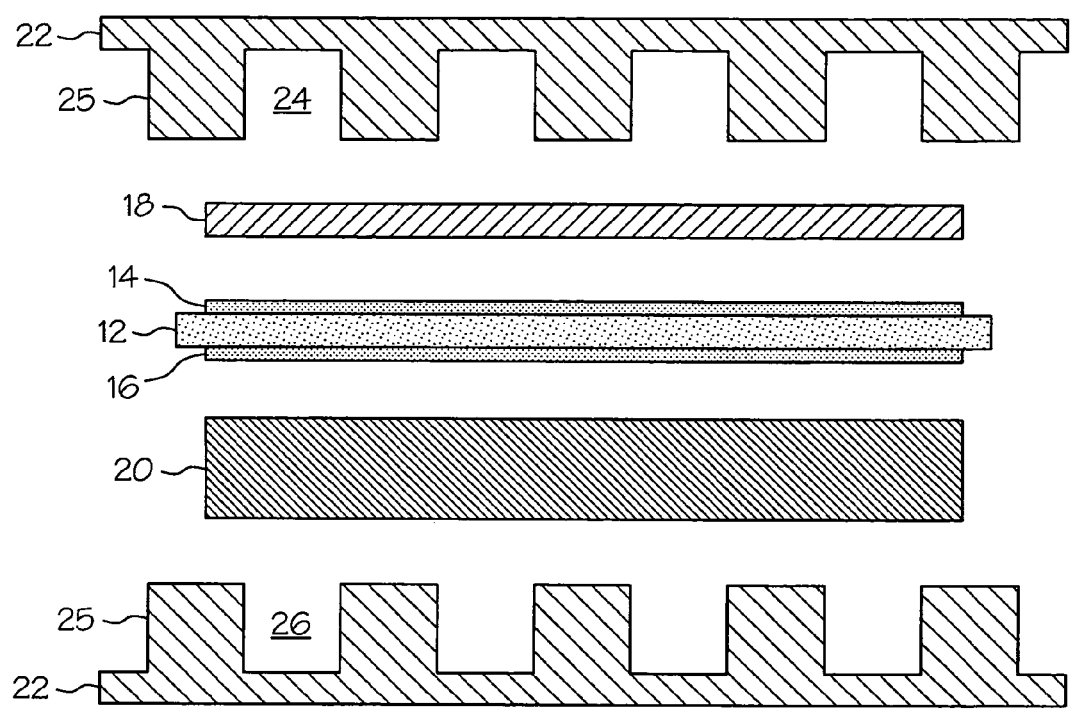
FIG. 2 is a partially exploded, sectional view of a portion of a fuel cell stack according to the present invention.

One way to alter the water vapor permeance of the cathode diffusion layer is to use a thicker layer. FIG. 2 is an exploded, sectional view of a portion of one embodiment of a fuel cell stack according to the present invention. The anode catalyst layer 14 and the cathode catalyst layer 16 overlie the proton exchange membrane 12. There is an anode diffusion layer 18 overlying the anode catalyst layer 14, and a cathode diffusion layer 20 overlying the cathode catalyst layer 16. There are bipolar plates 22 engaging the anode diffusion layer 18 and the cathode diffusion layer 20. On the bipolar plates 22, lands 25 separate adjacent sections of the reactant gas flow channels 24, 26. In this embodiment, the cathode diffusion layer 20 is thicker than the anode diffusion layer 18. The thicker cathode diffusion layer makes it more difficult for water vapor to travel quickly through the thickness of the layer, producing a water vapor concentration gradient within the layer to maintain the proton exchange membrane in a sufficiently hydrated state.

However, if the cathode diffusion layer is too thick, the residence time of the water vapor in the layer becomes too long, resulting in the flooding of the fuel cell unit on the cathode side. In addition, if the cathode diffusion layer is too thick, the fuel cell stacks may have an unacceptably high volume.

The cathode diffusion layer is generally less than about 1000 microns thick, and it is typically in the range of about 150 to about 600 microns, or in the range of about 200 to about 500 microns.

If desired, the anode diffusion layer can be made thinner than the cathode diffusion layer. The anode diffusion layer is generally greater than about 50 microns thick, and it can be in the range of about 75 to about 200 microns thick, if desired. The ratio of the thickness of the cathode diffusion layer to the thickness of the anode diffusion layer can be between about 20:1 to about 3:1, and can be at least about 4:1, if desired.

Another way to achieve the desired water vapor permeance is to control the bulk density of the cathode diffusion layer. The bulk density of the cathode diffusion layer is generally less than about 2.0 g/cc, and is typically in the range of between about 0.4 g/cc and about 0.8 g/cc.

The bulk density of the anode diffusion layer can also be controlled, if desired. It can be greater than about 0.1 g/cc, and can be in the range of between about 0.15 g/cc and about 0.5 g/cc, if desired. The ratio of the bulk density of the cathode diffusion layer to the anode diffusion layer can be selected to be between about 20:1 and about 1.5:1, if desired.

The porosity of the cathode diffusion layer can also be controlled to achieve the desired water vapor permeance. The cathode diffusion layer is generally greater than about 25% porous, and is typically in the range of between about 50% porous and about 80% porous.

The porosity of the anode diffusion layer can also be controlled, if desired. It is generally less than about 95% porous, and is typically between about 70% porous and about 90% porous. The ratio of the porosity of the cathode diffusion layer to the anode diffusion layer can be between about 1:3.8 and about 1:1.25, if desired.

If desired, the water vapor permeance of the cathode diffusion layer can also be obtained by including different amounts of polytetrafluoroethylene. The cathode diffusion layer can contain between about 0.25 wt % and about 25 wt % polytetrafluoroethylene, and can contain between about 5 wt % and about 15 wt % polytetrafluoroethylene, if desired.

The amount of polytetrafluoroethylene in the anode diffusion layer can also be controlled, if desired. The anode diffusion layer can contain less than about 15 wt % polytetrafluoroethylene, and it can contain between about 3 wt % and about 10 wt % polytetrafluoroethylene, if desired.

However, if the level of polytetrafluoroethylene is too high in either the cathode or the anode diffusion layer, it may reduce the conductivity of the diffusion layer to an unacceptable level.

Optimizing the water vapor transmission rate of the cathode diffusion layer can also be achieved using a special form of a conventional microporous layer (MPL). MPLs have been in use in certain types of PEM fuel cells for over 10 years and can be added as a discrete layer to one or both faces of the diffusion layer substrate (the carbon/graphite fiber matrix). An MPL is generally made in dispersion form from various blends of carbon/graphite particles, hydrophobic fluoropolymers, and a solvent. An MPL's primary function is to wick excess liquid water away from the cathode catalyst and diffusion layer interface, and it is designed to provide performance improvement under wet operating conditions.

The specialized type of MPL beneficial to this invention could be made of similar or differing materials, where the particle size, particle density, binder loading, porosity, pore-size distribution, and thickness are the properties to be tailored and controlled. Suggested materials are carbon, graphite, or any other electrically conductive, corrosion-resistant materials mixed together with a binding fluoropolymer such as polytetrafluoroethylene (PTFE), polyvinylidene fluoride (PVDF), or any other suitable chemically inert polymer. Preferred manufacturing techniques for applying the layer are tape casting, drawbar coating, curtain coating, or spraying. A thin sheet or roll of a material with the desired properties could also be purchased or made separately and then physically added to the diffusion layer substrate as a "sublayer" rather than as a coating.

Regardless of the manufacturing or assembly method, adding the layer to one side or the other (i.e., deciding on whether the MPL should go against the cathode catalyst or the cathode flow-field lands) may provide an extra performance benefit. A trilayer structure, where an MPL is added to both substrate faces, may provide still further utility. For instance, an MPL coating on each face might be used under excessively dry conditions (such as very low inlet cathode humidity and high operating temperature), where only one MPL may be required in other cases (one or the other of very low inlet humidity or high operating temperature). A structure with one or more MPLs could be designed and constructed to have the desired water vapor permeance.

Another alternative to achieving the desired water-transport properties would be to fill the porous volume of the diffusion layer substrate (i.e., the carbon fiber matrix) with the same carbon/graphite and fluoropolymer materials, giving it a "densified" nature. The end result would be a single-layer (rather than bilayer or trilayer) composite structure with a significantly lower porosity, smaller pore-size, and higher bulk density.

These alternative techniques, and their associated manufacturing steps, are well known and understood by skilled artisans in the area of PEM fuel cell component development.

In one embodiment, the cathode diffusion layer contains less than about 15 wt % polytetrafluorethylene and has a water vapor permeance of less than about $3 \times 10^{-4}$ g/(Pa s m$^2$) at 80° C. and 1 atmosphere. It typically contains between about 5 wt % and 15 wt % polytetrafluorethylene. The cathode diffusion layer is generally less than about 1000 microns thick, typically in the range of between about 150 and about 600 microns. The bulk density of the cathode diffusion layer is generally less than about 2.0 g/cc, typically between about 0.4 g/cc and about 0.8 g/cc. The cathode diffusion layer has a porosity generally greater than about 25%, typically in the range of between about 50% and about 80%.

In another embodiment, the cathode diffusion layer comprises a cathode diffusion layer having a water vapor permeance of less than about $3 \times 10^{-4}$ g/(Pa s m$^2$) at 80° C. and 1 atmosphere, and wherein the cathode diffusion layer is less than about 1000 microns thick, and wherein a bulk density of the cathode diffusion layer is less than about 2.0 g/cc, and wherein the cathode diffusion layer has a porosity greater than about 25%.

One or more of the different approaches to making a cathode diffusion layer having the desired water vapor permeance can be combined, if desired.

Suitable materials for use as the diffusion layers include, but are not limited to, porous graphite, carbon papers, felts, cloths, or other wovens and non-wovens. In addition, metallic foams, screens, meshes, or matrices could also be used.

The present invention will typically be used for proton exchange membranes operating at a temperature in the range of about 75° C. to about 175° C., and at a pressure in the range of about 100 kPa to about 200 kPa absolute.

EXAMPLE 1

Figure 3:
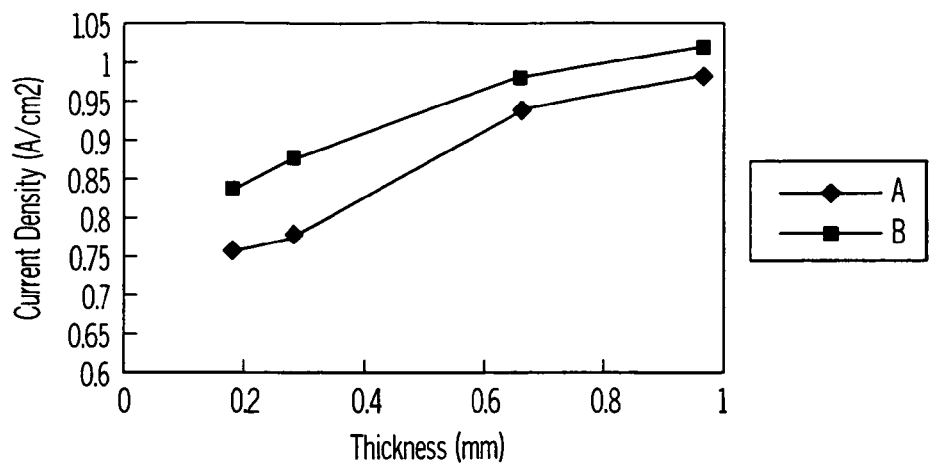
FIG. 3 shows a plot of current density v. thickness of the cathode diffusion layer at a cell potential of 0.6V for two different levels of external humidification.

FIG. 3 shows a plot of current density v. thickness of the cathode diffusion layer at a cell potential of 0.6 V for two different levels of external humidification. Each point is time averaged over 3 hours. Table 1 provides the experimental conditions. FIG. 3 shows that the current density increases monotonically with thickness for the range of thicknesses presented. The curve should eventually reach a maximum and then decline at larger thicknesses due to either flooding of the cathode diffusion layer at the interface between the cathode catalyst layer and the cathode diffusion layer, or limited rates of oxygen mass transfer to the cathode. Additional work at higher current densities (>1 A/cm$^2$), which is not presented here, supports the flooding hypothesis.

The current density increase is approximately 30% for series A (with lower humidity) and 20% for series B (with higher humidity). Thus, the benefits of the thicker diffusion layer are greater at drier conditions.

TABLE 1

| Parameter | Series A | Series B |
| --- | --- | --- |
| Anode back pressure | 150 kPa (abs) | 150 kPa (abs) |
| Cathode back pressure | 150 kPa (abs) | 150 kPa (abs) |
| Fuel composition (dry) | 100% H$_2$ | 100% H$_2$ |
| Stochiometric fuel flow | 1.3 | 1.3 |
| Stoichiometric air flow | 2.0 | 2.0 |
| Cell temperature | 80° C. | 80° C. |
| Anode stream dew point | 73° C. | 73° C. |
| Cathode stream dew point | 35° C. | 45° C. |
| Cell potential | 0.6 V | 0.6 V |
| Electrode area | 50 cm$^2$ | 50 cm$^2$ |

EXAMPLE 2

Figure 4:
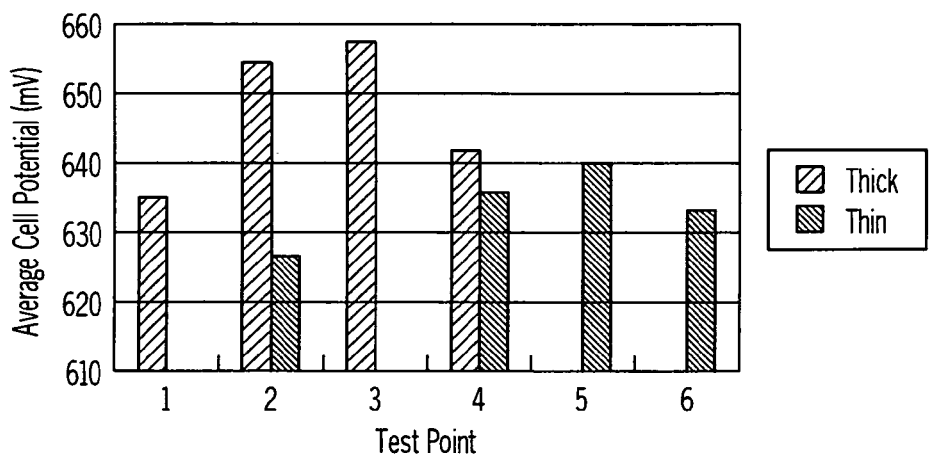
FIG. 4 shows a comparison of the average cell voltage of a 10-cell stack with cathode diffusion layers, each 840 ❑m thick, to the average cell voltage of a 15-cell stack containing cathode diffusion layers, each 195 ❑m thick, at various humidification levels.

FIG. 4 compares the average cell performance of a 10-cell stack with thick cathode diffusion layers (840 μm) to that of a 15-cell stack with thin cathode diffusion layers (195 μm) at various humidification levels. Tables 2 and 3 provide the operating conditions.

TABLE 2

| Parameter | Series A |
| --- | --- |
| Anode inlet pressure | 150 kPa (abs) |
| Cathode inlet pressure | 150 kPa (abs) |
| Fuel composition (dry) | 65% H$_2$, 35% N$_2$ |
| Stoichiometric fuel flow | 1.3 |
| Average coolant temperature | 78° C. |
| Anode dew point | See table 3 |
| Cathode dew point | See table 3 |
| Current density | 0.8 A/cm$^2$ |
| Electrode area | 519 cm$^2$ |

TABLE 3

| Test point | Anode dew point | Cathode dew point | RH$_{exit}$ |
| --- | --- | --- | --- |
| 1 | 80 | 49 | 1.05 |
| 2 | 73 | 49 | 0.95 |
| 3 | 77 | 32 | 0.92 |
| 4 | 60 | 64 | 1.02 |
| 5 | 73 | 64 | 1.11 |
| 6 | 80 | 64 | 1.20 |

The maximum cell potential achieved by the stack with the thick diffusion layers was significantly better than the stack with the thin diffusion layers. In addition, the performance of the stack with thick diffusion layers improves as the amount of added humidification water decreases. The optimum performance of the stack with thick diffusion layers occurs at lower humidification levels than that of the stack with the thin diffusion layers (RH$_{exit}$=0.92 as opposed to RH$_{exit}$=1.11, where RH$_{exit}$ is the equilibrium average relative humidity of both product gas streams exiting the membrane electrode assembly). Thus, the design is optimized for low humidification levels, as expected. At high humidification levels, the stack with thick diffusion layers floods and performs worse than the stack with thin diffusion layers.

EXAMPLE 3

Figure 5:
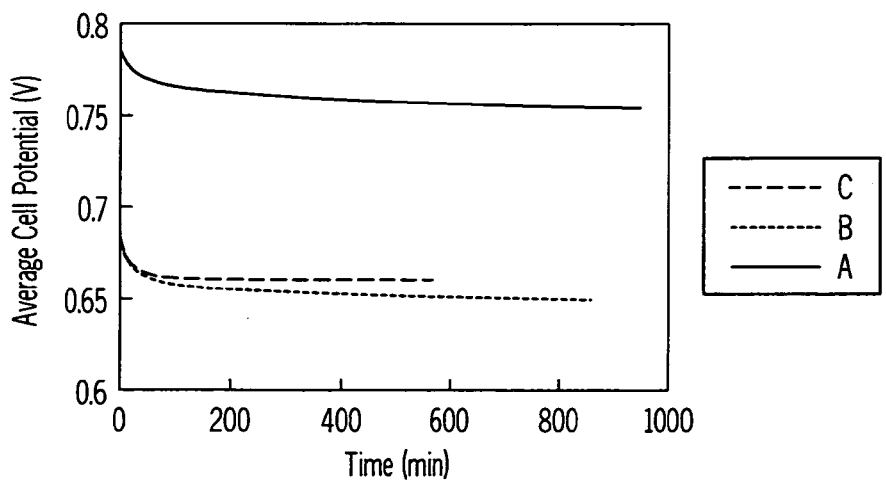
FIG. 5 shows the decay of the average cell potential at fixed current densities over longer periods of time at three operating conditions.

FIG. 5 shows the decay of the average cell potential at fixed current densities over longer periods of time at three operating conditions for a 10-cell stack with 840 μm thick cathode diffusion layers. Table 4 provides the operating conditions.

TABLE 4

| Parameter | Series A | Series B | Series C |
|---|---|---|---|
| Anode inlet pressure | 150 kPa (abs) | 150 kPa (abs) | 200 kPa (abs) |
| Cathode inlet pressure | 150 kPa (abs) | 150 kPa (abs) | 200 kPa (abs) |
| Fuel composition (dry) | 65% $H_2$, 35% $N_2$ | 65% $H_2$, 35% $N_2$ | 65% $H_2$, 35% $N_2$ |
| Stoichiometric fuel flow | 1.3 | 1.3 | 1.3 |
| Average coolant temp. | 78° C. | 78° C. | 78° C. |
| Anode dew point | 73° C. | 73° C. | 73° C. |
| Cathode dew point | Dry | Dry | Dry |
| Current density | 0.2 A/cm$^2$ | 0.8 A/cm$^2$ | 0.8 A/cm$^2$ |
| Electrode area | 519 cm$^2$ | 519 cm$^2$ | 519 cm$^2$ |
| Rate of decline | 900 μV/h | 720 μV/h | 44 μV/h |
| $RH_{exit}$ | 0.82 | 0.82 | 0.99 |

The potential declines at a rate of approximately 1 mV/h at the 150 kPa test points. This indicates that the membrane electrode assemblies are slowly drying at this humidification level. At 200 kPa, the rate of potential decline is more than a factor of 10 lower. Thus, with proper optimization of gas inlet pressure, the thick cathode diffusion layer permits stable, long-term performance without external humidification of the cathode stream at low pressure ($\leq$200 kPa (abs)).

Water Vapor Permeance Test

There is no agreed upon test method for water vapor permeance under conditions that apply to fuel cells. The following test method is derived from ASTM Method E96 (Standard Test for Water Vapor Transmission of Materials) and the Canadian Turl Dish Method, BS 7209 (T. Woodbridge, "Breathability—Fact and Fiction", *The New Nonwovens World*, Fall 1993), which are incorporated herein by reference, modified to represent fuel cell conditions.

The method is based on Procedure B and D of ASTM E96 in which a cup is filled with water and capped using the sample material. The water vapor transmission (WVT) rate is inferred from the weight loss of the water measured over time. The permeance can then be determined from the WVT data.

The resistance to water transmission (inverse of permeance) of the sample must be at least 10% of the other resistances in the test arrangement, or the method is not accurate. We found that using one layer of diffusion media did not provide adequate resistance, but the use of five layers of diffusion media did provide sufficient resistance.

Sample Preparation

Figure 7:
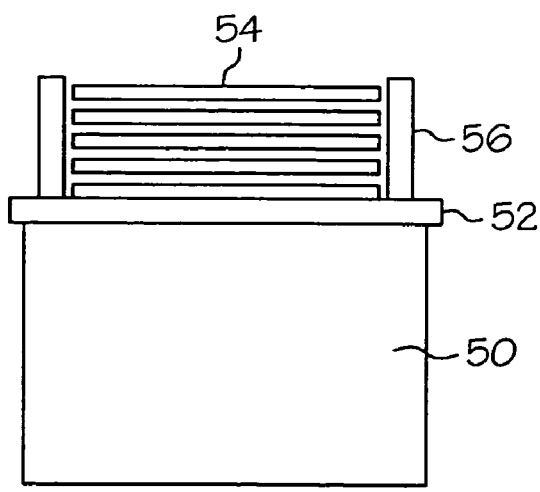
FIG. 7 is a schematic of the sample container for a permeance test.

A 9 oz. (266 ml) plastic container 50 with a snap-on lid 52 was used. An opening 4.5 cm×4.5 cm was cut in the center of the snap-on lid. Five samples 5.5 cm×5.5. cm of the gas diffusion material to be tested were cut. The first layer of diffusion material was placed over the opening in the lid. A 3 mm bead of silicone sealant was applied around the edges of one surface of the diffusion layer, sealing the diffusion layer over the opening in the lid. The remaining four layers of diffusion media were sealed by applying a thin bead of silicone sealant around the edges between each layer, stacking the five layers evenly together. The outer edge of the five layers of diffusion media 54 were sealed with silicone sealant 56 to ensure that the water vapor transmission was entirely in the through-plane direction of the samples. The silicone sealant was then allowed to fully cure. The snap-on lid with the samples is shown in FIG. 7.

The plastic container was then filled with deionized water to a level 1 cm from the top. The lid with the samples was then attached. The container filled with water and including the snap-on lid with the samples was then weighed.

Sample Heating

A standard laboratory drying oven was used. The oven was preheated to 80° C. prior to beginning the test.

Approximately 1 meter length of ¼ inch copper tubing was coiled and placed in the oven. A 6 inch length of the coiled copper tube was placed through a vent hole on top of the oven and supported. The coiled copper tubing was attached to a compressed air regulator with Tygon® tubing. The use of coiled copper tubing allows the air to reach oven temperature before it exits the tubing into the oven. The outlet of the tubing is described below.

Figure 8:
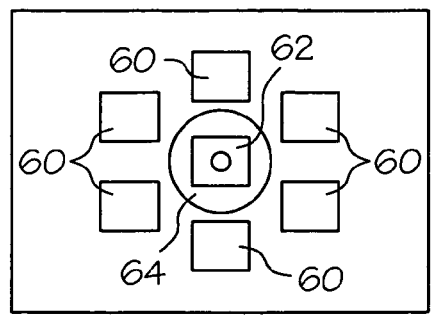
FIG. 8 is a top view of the sample containers arranged in the drying oven for a permeance test.
Figure 9:
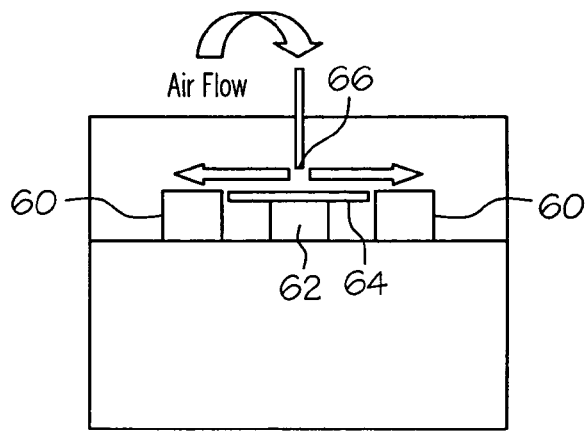
FIG. 9 is a side view of the dish arrangement in the drying oven for a permeance test.

Six containers 60, each with five layers of diffusion media, were tested at one time. FIG. 8 shows the samples in the oven. The six containers were placed in a circle on the top shelf of the oven. An empty plastic container 62 was placed in the center of the circle of samples. A flat bottom glass dish 64 was placed upside down on the empty container 62. The outlet of the copper tubing 66 was positioned 2 inches above the center of the flat bottom glass dish, as shown in FIG. 9 (the coil of tubing is not shown). The flat bottom dish acts to evenly distribute the air flow across the top of the six samples.

The air flow was then adjusted to a constant rate such that the velocity of dry air over the samples was at least 0.25 meters per second. The oven door was closed, and the time recorded. The test was left undisturbed for 24 hours. (Opening the door during the test may alter the results due to temperature variations.) After 24 hours, the air flow was turned off, and the sample containers removed and weighed.

The WVT is determined by dividing the weight loss (g) due to water evaporation by the amount of time (24 hours or 86,400 seconds) and the exposed surface area (2.03×10$^{-3}$ m$^2$). Table 5 shows the results for five samples.

TABLE 5

| Paper Type | Paper Thickness (micron) | WVT (gm/s/m$^2$) |
|---|---|---|
| Toray 030 | 120 | 0.830 |
| Toray 060 | 210 | 0.744 |
| Toray 090 | 280 | 0.714 |
| Toray 10T | 1000 | 0.524 |
| SGL GDL-10HM | 410 | 0.720 |

The first four samples were commercial products from Toray Industries, Inc., Otsu, Shiga, Japan. They are different thicknesses of the same basic material. The last sample was a developmental product from SGL Carbon Group, SGL Technologies, GmbH, Meitingen, Germany.

Data Analysis

The permeance of the diffusion layer can be determined from the WVT data.

$$WVT = S(RH_1 - RH_2) \times \Pi_{Tot} \quad (1)$$

where

WVT=water vapor transmission rate (g/(s m2))

S=water saturation vapor pressure at test temperature (47322 Pa at 80° C.)

$RH_1$=relative humidity at source expressed as fraction (1.0 in this method at liquid water surface)

$RH_2$=relative humidity at sink expressed as fraction (0 in this method in flowing dry stream)

$\Pi_{Tot}$=total permeance of system including three contributions: water to paper, through paper, paper to dry gas (g/(Pa S $m^2$)).

The total permeance of the system includes effects from other water vapor transport resistances present in the test, so the permeance of the diffusion layers must be extracted from the data. The four samples with the same base material but different thicknesses were used to calibrate the test method and determine resistances to water vapor transport not associated with the diffusion layers. This is done by extrapolating to project a case with zero diffusion layer thickness, as shown below. Using this calibration information, the permeance of any diffusion layer sample can be isolated.

The total resistance to water transport, $R_{Tot}$, is the inverse of the total permeance. It includes three resistances in series:

$$R_{Tot} = 1/\Pi_{Tot} = R_{W,DM} + R_{DM} + R_{DM,G} \quad (2)$$

where $R_{W,DM}$=water vapor transport resistance between water surface and bottom diffusion layer surface ((Pa s $m^2$)/g)

$R_{DM}$=water vapor transport resistance due to diffusion layer bulk ((Pa s $m^2$)/g)

$R_{DM,G}$=water vapor transport resistance between top diffusion layer surface and flowing dry gas ((Pa s $m^2$)/g).

When the evaluated set of diffusion media samples consists of a stack of multiple sheets of the same diffusion media material, the resistance of the diffusion media is proportional to the diffusion media stack thickness and inversely proportional to the material permeability.

$$R_{DM} = \frac{n}{\Pi_{DM}} = \frac{n \delta_{DM}}{\pi_{DM}} \quad (3)$$

where n=number of layers of diffusion media used in test $\Pi_{DM}$=permeance of single diffusion layer (g/(Pa s $m^2$)).

$\delta_{DM}$=thickness of single diffusion layer (m).

$\pi_{DM}$=permeability of diffusion layer (g/(Pa s m))

The permeability is an intrinsic property of a material and is independent of the thickness. The permeance depends on sample thickness.

The two constants of the test, independent of the diffusion media sample, and which must be calibrated for, can be grouped together as one resistance $R_0$:

$$R_0 = R_{W,DM} + R_{DM,G} \quad (4)$$

Combining equations (1), (2), (3), and (4):

$$\frac{S}{WVT} = \frac{n \delta_{DM}}{\pi_{DM}} + R_0 \quad (5)$$

A plot of S/WVT v. total thickness of all layers of diffusion media ($\delta_{DM}$) can be used to extract the resistance of the system, characteristic of the equipment, from the intercept, $R_0$. The slope can be used to determine the permeability, $\pi_{DM}$.

Figure 10:
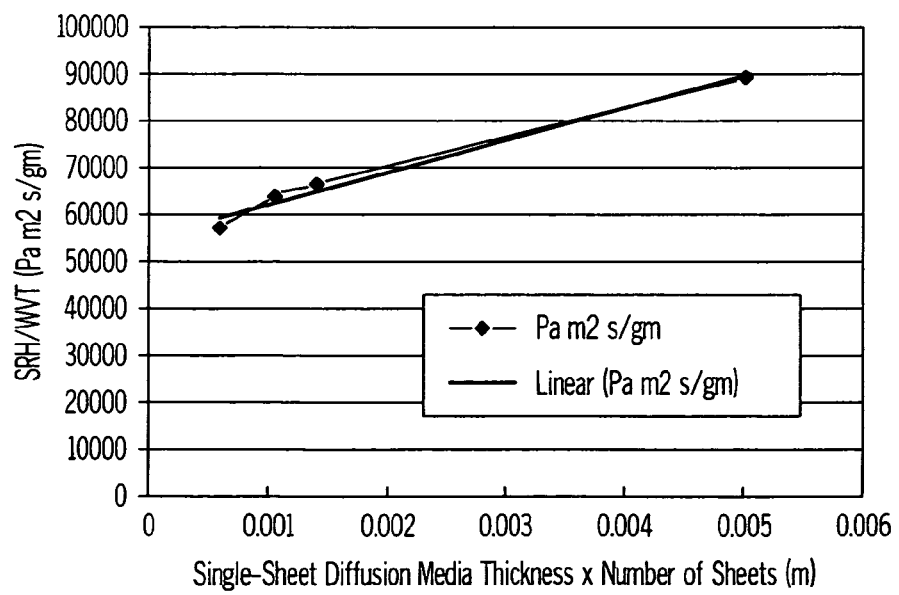
FIG. 10 is a plot of S/WVT (reciprocal of the permeance) v. thickness of a diffusion layer according to the present invention.

The data for the first four samples (same material, different thicknesses) is shown in FIG. 10. As expected, the data produced a straight line, with the following best-fit line:

$$\frac{S}{WVT} = 7174000 \times (n \delta_{DM}) + 54880 \quad (6)$$

From this, $R_0$ can be determined:

$$R_0 = 54880 (Pa\ m^2\ s)/g \quad (7)$$

The permeability of the Toray diffusion layer samples is:

$$\pi_{DM} = 1.39 \times 10^{-7}\ g/(Pa\ m\ s) \quad (8)$$

Using equation 3, the resistance due to the five layers of diffusion media can be calculated and compared to the other resistances in the test method. Results are shown in Table 6.

TABLE 6

|  | Resistance to WVT (Pa $m^2$ s/gm) | % of Total Resistance due to all layers of Diffusion Media |
|---|---|---|
| $R_0$ | 54480 | — |
| Toray 030 diffusion media (5 layers of 120 micron each) | 4310 | 7 |
| Toray 10T diffusion media (5 layers of 1000 micron each) | 35970 | 40 |

The contributions to the total resistance are 7% for the thinnest diffusion layer and 40% for the thickest.

Once the value for $R_0$ has been determined, equations (3), and (5) can be used to calculate the permeance for a single layer of the materials tested:

$$\frac{S}{WVT} = \frac{n}{\Pi_{DM}} + R_0 \quad (9)$$

which can be rearranged to give:

$$\Pi_{DM} = \frac{n}{\frac{S}{WVT} - R_0} \quad (10)$$

Table 7 gives the results for five samples tested.

TABLE 7

| Paper Type | Paper Thickness (micron) | Permeance of Single-Sheet ($g/(Pa\ s\ m^2)$) |
|---|---|---|
| Toray 030 | 120 | 2.3E−03 |
| Toray 060 | 210 | 5.7E−04 |
| Toray 090 | 280 | 4.4E−04 |
| Toray 10T | 1000 | 1.4E−04 |
| SGL GDL-10HM | 410 | 4.6E−04 |

While certain representative embodiments and details have been shown for purposes of illustrating the invention, it will be apparent to those skilled in the art that various changes in the compositions and methods disclosed herein may be made without departing from the scope of the invention, which is defined in the appended claims.

The invention claimed is:

1. A fuel cell system comprising:
   a proton exchange membrane having a first face and a second face;
   a cathode catalyst layer overlying the first face of the proton exchange membrane;
   a cathode diffusion layer overlying the cathode catalyst layer;
   an anode catalyst layer overlying the second face of the proton exchange membrane;
   an anode diffusion layer overlying the anode catalyst layer;
   wherein the cathode diffusion layer has a water vapor permeance of less than about $3\times10^{-4}$ g/(Pa s m$^2$) at 80° C. and 1 atmosphere.

2. The fuel cell system of claim 1 wherein the water vapor permeance of the cathode diffusion layer is less than about $2\times10^{-4}$ g/(Pa s m$^2$) at 80° C. and 1 atmosphere.

3. The fuel cell system of claim 1 wherein the water vapor permeance of the cathode diffusion layer is less than about $1.5\times10^{-4}$ g/(Pa s m$^2$) at 80° C. and 1 atmosphere.

4. The fuel cell system of claim 1 wherein a water vapor permeance of the anode diffusion layer is greater than about $3\times10^{-4}$ g/(Pa s m$^2$) at 80° C. and 1 atmosphere.

5. The fuel cell system of claim 1 wherein the water vapor permeance of the cathode diffusion layer is between about 10 and about 50% of a water vapor permeance of the anode diffusion layer.

6. The fuel cell system of claim 1 wherein a thickness of the cathode diffusion layer is less than about 1000 microns.

7. The fuel cell system of claim 6 wherein the thickness of the cathode diffusion layer is in a range of about 150 to about 600 microns.

8. The fuel cell system of claim 7 wherein a thickness of the anode diffusion layer is in a range of about 75 to about 200 microns.

9. The fuel cell system of claim 6 wherein a bulk density of the cathode diffusion layer is less than about 2.0 g/cc.

10. The fuel cell system of claim 9 wherein the bulk density of the cathode diffusion layer is in a range of about 0.4 to about 0.8 g/cc.

11. The fuel cell system of claim 6 wherein a porosity of the cathode diffusion layer is greater than about 25%.

12. The fuel cell system of claim 11 wherein the porosity of the cathode diffusion layer is in a range of about 50% to about 80%.

13. The fuel cell system of claim 6 wherein the cathode diffusion layer contains between about 5 wt % to about 15 wt % polytetrafluoroethylene.

14. The fuel cell system of claim 1 wherein a ratio of a thickness of the cathode diffusion layer to a thickness of the anode diffusion layer is between about 20:1 to about 3:1.

15. The fuel cell system of claim 1 wherein a bulk density of the cathode diffusion layer is less than about 2.0 g/cc.

16. The fuel cell system of claim 15 wherein the bulk density of the cathode diffusion layer is in a range of about 0.4 g/cc to about 0.8 g/cc.

17. The fuel cell system of claim 16 wherein a bulk density of the anode diffusion layer is in a range of about 0.15 g/cc to about 0.5 g/cc.

18. The fuel cell system of claim 15 wherein a thickness of the cathode diffusion layer is less than about 1000 microns.

19. The fuel cell system of claim 18 wherein the thickness of the cathode diffusion layer is in a range of about 150 to about 600 microns.

20. The fuel cell system of claim 15 wherein a porosity of the cathode diffusion layer is greater than about 25%.

21. The fuel cell system of claim 20 wherein the porosity of the cathode diffusion layer is in a range of about 50% to about 80%.

22. The fuel cell system of claim 15 wherein the cathode diffusion layer contains between about 5 wt % to about 15 wt % polytetrafluoroethylene.

23. The fuel cell system of claim 1 wherein a ratio of a bulk density of the cathode diffusion layer to a bulk density of the anode diffusion layer is between about 20:1 and about 1.5:1.

24. The fuel cell system of claim 1 wherein a porosity of the cathode diffusion layer is greater than about 25%.

25. The fuel cell system of claim 24 wherein the porosity of the cathode diffusion layer is in a range of about 50% to about 80%.

26. The fuel cell system of claim 25 wherein a porosity of the anode diffusion layer is in a range of about 70% to about 90%.

27. The fuel cell system of claim 24 wherein a thickness of the cathode diffusion layer is less than about 1000 microns.

28. The fuel cell system of claim 27 wherein the thickness of the cathode diffusion layer is in a range of about 150 to about 600 microns.

29. The fuel cell system of claim 24 wherein a bulk density of the cathode diffusion layer is less than about 2.0 g/cc.

30. The fuel cell system of claim 29 wherein the bulk density of the cathode diffusion layer is in a range of about 0.4 to about 0.8 g/cc.

31. The fuel cell system of claim 24 wherein the cathode diffusion layer contains between about 5 wt % to about 15 wt % polytetrafluoroethylene.

32. The fuel cell system of claim 1 wherein a ratio of a porosity of the cathode diffusion layer to a porosity of the anode diffusion layer is between about 1:3.8 and about 1:1.25.

33. The fuel cell system of claim 1 wherein the cathode diffusion layer contains at least about 0.25 wt % polytetrafluoroethylene.

34. The fuel cell system of claim 33 wherein the cathode diffusion layer contains in a range of about 5 wt % to about 15 wt % polytetrafluoroethylene.

35. The fuel cell system of claim 34 wherein the anode diffusion layer contains in a range of about 3 wt % to about 10 wt % polytetrafluoroethylene.

36. The fuel cell system of claim 33 wherein a thickness of the cathode diffusion layer is less than about 1000 microns.

37. The fuel cell system of claim 36 wherein the thickness of the cathode diffusion layer is in a range of about 150 to about 600 microns.

38. The fuel cell system of claim 33 wherein a bulk density of the cathode diffusion layer is less than about 2.0 g/cc.

39. The fuel cell system of claim 38 wherein the bulk density of the cathode diffusion layer is in a range of about 0.4 to about 0.8 g/cc.

40. The fuel cell system of claim 33 wherein a porosity of the cathode diffusion layer is greater than about 25%.

41. The fuel cell system of claim 40 wherein the porosity of the cathode diffusion layer is in a range of about 50% to about 80%.

42. The fuel cell system of claim 1 wherein the proton exchange membrane remains fully hydrated during operation of the fuel cell system without use of an external cathode hydration system.

43. A fuel cell system comprising:
a proton exchange membrane having a first face and a second face;
a cathode catalyst layer overlying the first face of the proton exchange membrane;
a cathode diffusion layer overlying the cathode catalyst layer;
an anode catalyst layer overlying the second face of the proton exchange membrane;
an anode diffusion layer overlying the anode catalyst layer;
wherein the cathode diffusion layer has a water vapor permeance of less than about $3\times10^{-4}$ g/(Pa s m$^2$) at 80° C. and 1 atmosphere, and wherein a thickness of the cathode diffusion layer is less than about 1000 microns, and wherein a bulk density of the cathode diffusion layer is less than about 2.0 g/cc, and wherein a porosity of the cathode diffusion layer is greater than about 25%.

44. The fuel cell system of claim 43 wherein the thickness of the cathode diffusion layer is in a range of about 150 to about 600 microns.

45. The fuel cell system of claim 43 wherein the bulk density of the cathode diffusion layer is in a range of about 0.4 to about 0.8 g/cc.

46. The fuel cell system of claim 43 wherein the porosity of the cathode diffusion layer is in a range of about 50% to about 80%.

47. The fuel cell system of claim 43 wherein the cathode diffusion layer contains in a range of about 5 to about 15 wt % polytetrafluoroethylene.

48. A cathode diffusion layer for a fuel cell system comprising:
a cathode diffusion layer containing less than 15 wt % polytetrafluoroethylene and having a water vapor permeance of less than about $1.5\times10^{-4}$ g/(Pa s m$^2$) at 80° C. and 1 atmosphere.

49. The cathode diffusion layer of claim 48 wherein a thickness of the cathode diffusion layer is less than about 1000 microns.

50. The cathode diffusion layer of claim 49 wherein the thickness of the cathode diffusion layer is in a range of about 150 microns to about 600 microns.

51. The cathode diffusion layer of claim 48 wherein a bulk density of the cathode diffusion layer is less than about 2.0 g/cc.

52. The cathode diffusion layer of claim 51 wherein the bulk density of the cathode diffusion layer is in a range of about 0.4 to about 0.8 g/cc.

53. The cathode diffusion layer of claim 48 wherein a porosity of the cathode diffusion layer is greater than about 25%.

54. The cathode diffusion layer of claim 53 wherein a porosity of the cathode diffusion layer is in a range of about 50% to about 80%.

55. The cathode diffusion layer of claim 48 wherein the cathode diffusion layer contains in a range of about 5 wt % to about 15 wt % polytetrafluoroethylene.

56. The cathode diffusion layer of claim 48 further comprising a microporous layer on a face of the cathode diffusion layer.

57. The cathode diffusion layer of claim 48 wherein a porous volume of the cathode diffusion layer contains carbon/graphite and fluoropolymer materials.

58. A cathode diffusion layer for a fuel cell system comprising:
a cathode diffusion layer having a water vapor permeance of less than about $3\times10^{-4}$ g/(Pa s m$^2$) at 80° C. and 1 atmosphere, and wherein a thickness of the cathode diffusion layer is in a range of about 150 to about 200 microns, and wherein a bulk density of the cathode diffusion layer is less than about 2.0 g/cc, and wherein a porosity of the cathode diffusion layer is greater than about 25%.

59. The cathode diffusion layer of claim 58 wherein the water vapor permeance of the cathode diffusion layer is less than about $2\times10^{-4}$ g/(Pa s m$^2$) at 80° C. and 1 atmosphere.

60. The cathode diffusion layer of claim 58 wherein the water vapor permeance of the cathode diffusion layer is less than about $1.5\times10^{-4}$ g/(Pa s m$^2$) at 80° C. and 1 atmosphere.

61. The cathode diffusion layer of claim 58 wherein the bulk density of the cathode diffusion layer is in a range of about 0.4 to about 0.8 g/cc.

62. The cathode diffusion layer of claim 58 wherein a porosity of the cathode diffusion layer is in a range of about 50% to about 80%.

63. The cathode diffusion layer of claim 58 wherein the cathode diffusion layer contains in a range of about 5 wt % to about 15 wt % polytetrafluoroethylene.

64. The cathode diffusion layer of claim 58 further comprising a microporous layer on a face of the cathode diffusion layer.

* * * * *